Sargent & Bradford,
Twine Holder.

No. 112,501. Patented Mar. 7, 1871.

Witnesses
J. H. Shumway
A. J. Tibbits

Joseph B. Sargent & Piermont Bradford
Inventors
By their Attorney
John E. Earle

United States Patent Office.

JOSEPH B. SARGENT AND PURMORT BRADFORD, OF NEW HAVEN, CONNECTICUT, ASSIGNORS TO SARGENT & COMPANY, OF SAME PLACE.

Letters Patent No. 112,501, dated March 7, 1871.

IMPROVEMENT IN TWINE-HOLDERS.

The Schedule referred to in these Letters Patent and making part of the same.

*To all whom it may concern:*

Be it known that we, JOSEPH B. SARGENT and PURMORT BRADFORD, of New Haven, in the county of New Haven and State of Connecticut, have invented a new Improvement in Twine-Box; and we do hereby declare the following, when taken in connection with the accompanying drawing and the letters of reference marked thereon, to be a full, clear, and exact description of the same, and which said drawing constitutes part of this specification, and represents in—

Figure 1:
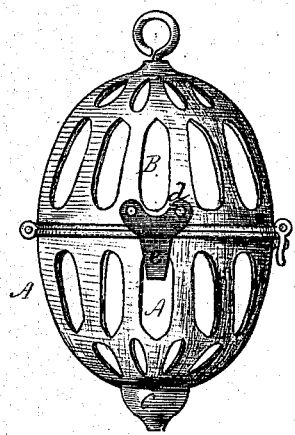
Figure 2:
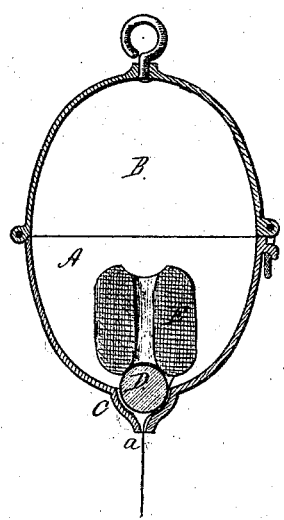

Figure 1, a side view;
Figure 2, a vertical central section; and in
Figure 3, a top view of a twine-box.

This invention relates to an improvement in twine-holders or boxes, the object being the construction of a self-acting friction to prevent the twine from running too freely from the box; also in a device for suspending or hanging the holder.

The invention consists in constructing the holder with a recess or chamber around the opening through which the twine runs, and the arrangement therein of a ball or weight which lies upon the twine, bearing with sufficient force to prevent the twine running too freely, and yet so that it may be drawn from the holder without inconvenience. Also, in forming upon one side of one part of the holder a hook or ears, by means of which the holder may be secured or suspended.

A is one part, B, the other part, of a common twine-holder.

At the point *a*, through which the twine is drawn, we form a recess C, into which we place a ball D, the ball made of metal, or any suitable material of sufficient weight to produce the desired result.

The ball of twine E is placed in the holder in the usual manner, the end of the twine passed through the opening *a*, then the ball D placed into the recess upon the twine, so that when the twine is drawn from the holder the ball will roll in its seat, or cause sufficient friction upon the twine to prevent its running too freely.

Figure 3:
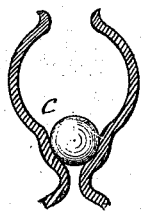

In this particular class of holders it is usual for the twine to be drawn through the lowest point; but in other holders, such as are placed upon the counter, where the twine is drawn through the top, it will be evident that the relative position of the chamber to the holder must be reversed, as seen in fig. 3.

Figure 4:
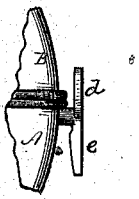

Upon one side of one of the parts (by preference A) we form, during the process of casting, a projecting ear *d*, here divided into two parts, each part perforated, for the insertion of screws through the perforations, by means of which screws the holder may be secured to the wall, edge of the shelf, or other desirable position. Below the ears we extend a tongue *e*, as seen in figs. 3 and 4, and by inserting this tongue into a loop or other device, which may be secured to the place where it is desired to suspend the holder, the holder is held in that position.

This construction affords the choice of two devices for securing the holder, either one of which may be used, the tongue *e* possessing this advantage, that the holder may be easily detached. Either one of the devices, that is, the tongue or ears, may be formed without the other, but we prefer both together.

We claim as our invention—

1. The arrangement, in a twine-holder, of the independent or detached ball D, resting in the seat C, formed around the opening through which the twine passes, substantially as described.

2. In a twine-holder, the securing device, consisting of the ear *d* or the tongue *e*, one or both formed upon one part of the holder during the process of casting, substantially in the manner and for the purpose set forth.

J. B. SARGENT,
PURMORT BRADFORD.

Witnesses:
A. J. TIBBITS,
J. H. SHUMWAY.